Figure 1:
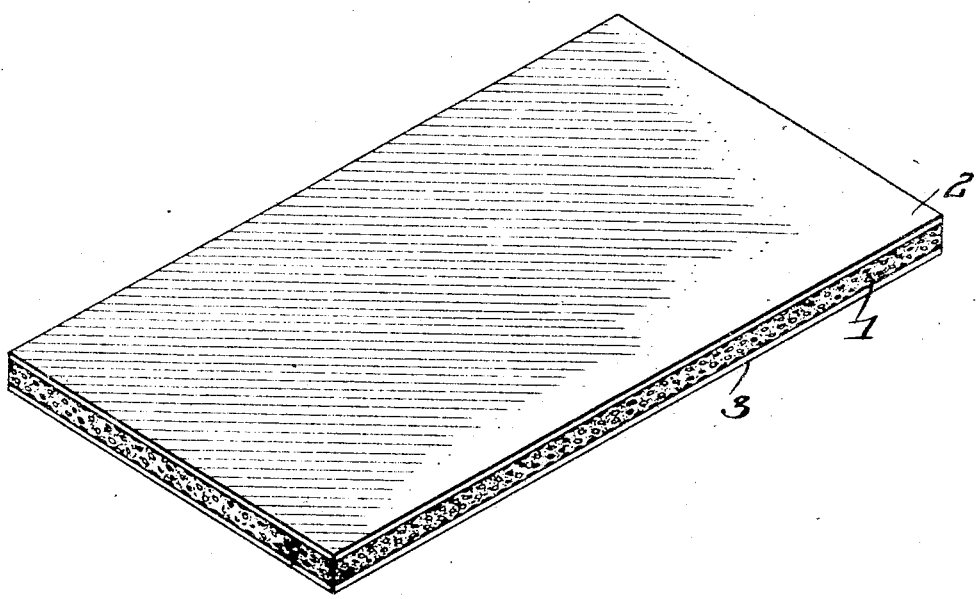

Sept. 1, 1931.  H. McC. SPENCER  1,821,120
MOLDED COMPOSITION
Filed April 5, 1929

INVENTOR
Hugh McCurdy Spencer
BY
his ATTORNEYS

Patented Sept. 1, 1931

1,821,120

UNITED STATES PATENT OFFICE

HUGH McCURDY SPENCER, OF LOCKPORT, NEW YORK, ASSIGNOR TO THE UPSON COMPANY, OF LOCKPORT, NEW YORK, A CORPORATION OF NEW YORK

MOLDED COMPOSITION

Application filed April 5, 1929. Serial No. 352,852.

My present invention relates to plastics and molded compositions made therefrom and more particularly to the production of cellular bodies produced by intumescing a plastic mass and has for its object to provide a cheap, light and serviceable product of this kind that can be used in the making of building material, such as wall board and similar articles.

To these and other ends the invention resides in certain improvements and combinations of parts, all as will be hereinafter more fully described, the novel features being pointed out in the claims at the end of the specification.

Figure 2:
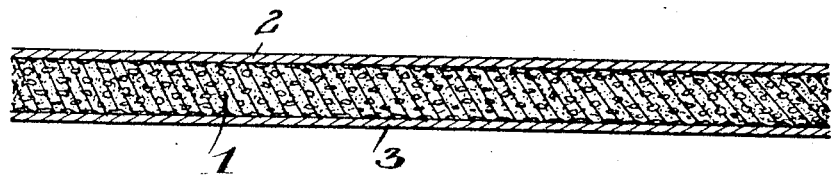

In the drawings:

Fig. 1 is a perspective view of a piece of wallboard made in accordance with and illustrating one manner in which my improvements may be utilized, and Fig. 2 is a section through the center.

Similar reference numerals throughout the several views indicate the same parts.

I accomplish the aforesaid ends by forming an intumesced porous composition of matter composed in part of finely divided inorganic material and sulfite liquor pitch. By sulfite liquor pitch, I mean the liquor, concentrated by evaporation, that has been obtained through the cooking of wood for paper or other manufacture with an aqueous solution of the acid sulfites of lime, and/or magnesium. This is available in great quantity and is very cheap, being in fact a by product of the paper industry usually wasted and for which a use has long been sought. In the commercial preparation of this sulfite liquor pitch, the sulfite liquor is usually rendered nearly neutral by suitable reagents prior to the concentration by evaporation, such concentration being often, but not invariably, carried on until a sufficient amount of the water in the liquor has been expelled so as to produce a dry powder.

In the present invention I may produce in either a continuous or in a discontinuous manner, porous, intumesced compositions of matter composed in part of pulverulent inorganic material and sulfite liquor pitch. I am aware that porous, intumesced molded compositions of matter have been produced by the action of heat upon a mixture of pulverulent, inorganic material and silicate of soda solution. However, such compositions of matter are heavier than those embraced in the scope of the present invention, and also the cost of silicate of soda makes such composition of matter more expensive than in the case of the present invention.

In making up the necessary mixture to produce the results in the present invention, I take sulfite liquor pitch of the proper consistency, and mix it intimately with pulverulent inorganic materials. Although I do not confine myself to any specific proportions in carrying out the present invention, the following has been found to be satisfactory:—
To 1000 lbs. of dry sulfite liquor pitch powder add 500 lbs. of hot water and dissolve. Take 200 lbs. of the resultant solution and thoroughly incorporate it with 800 lbs. of limestone ground so that over 95% of the material passes through a 200 mesh screen. This mixture may then be placed by any suitable device, such as feed rolls, between liners of paper, paper board, cloth and the like, and then subjected to heat in or by any suitable device, such as between steam-heated platens or in a mold or press, whereby the core mixture is permitted to expand to a limited degree and to produce an intumesced, porous composition of matter, the cells of which are produced by the bubbles of escaping steam as in any intumescing process.

In the accompanying drawings, I have shown my invention embodied in a wallboard, such as is used for building construction, wherein the intumesced, porous or cellular substance 1 constitutes the core faced on each side by fairly heavy paper liners 2 and 3. The liners constitute the desired and usual finished surface and the pitch, during the heating and intumescing process, adheres very firmly thereto while the liners in turn serve to prevent the pitch from adhering to the heating elements between which the product is passed or in which it is otherwise molded. This construction produces a very light yet strong board.

In carrying out my invention, I do not, as above stated, in any way restrict myself to the above proportion of sulfite liquor pitch and water. Neither do I restrict myself to ground limestone as the inorganic filler. A thinner or a more concentrated solution of sulfite liquor pitch may be used. If, however, the sulfite liquor pitch is too thin then the pores formed in the core during the intumescing operation are too coarse and also the requisite stiffness of the mix is absent, with the result that the pores collapse before their walls harden, and finally, if the sulfite liquor pitch is too thin the intumescence and boiling of the water in the pitch is so violent that there is a tendency to extrude the core in every free direction from the mold. On the other hand, if too concentrated a sulfite liquor pitch is used, the intumescence is inadequate, the pores are too small and too few, the entire core is crumbly, and the cost of the molded composition is increased.

As to the filler that is admixed with the pitch, it is possible to use limestone ground so fine that 100% will pass through a 300 mesh screen or even finer. In such a case the consumption of the sulfite liquor pitch by such fine material is higher than in the case of less finely divided material and the expense of producing the molded composition of matter therefrom is increased although the fineness of the product is also increased. Conversely, one may use a limestone ground so that less than 50% will pass through a 100 mesh screen. In such a case the consumption of sulfite liquor pitch is decreased by such relatively coarse material, but the porosity of the resultant material is less uniform than if finer material is used.

Again, instead of pulverulent limestone, it is possible to use pulverulent sandstone, pulverulent slag, pulverulent coal ashes, pulverulent shale, ground sand, or any other pulverulent inorganic material that is not substantially chemically reactive with sulfite liquor pitch or with water or with both.

I claim as my invention:

1. A porous, intumesced artificial mill board or wall board consisting of liners of paper or paper board and a porous intumesced core of sulfite liquor pitch and a pulverulent inorganic material.

2. A mill board, wallboard, or artificial board consisting of liners of paper or paper board and a core of intumesced porous pulverulent limestone and sulfite liquor pitch.

3. As a new article of manufacture, a wallboard comprising a pair of liners of sheet material and a porous cellular filling between said liners, said filling comprising a mixture of relatively finely divided inorganic material and sulfite liquor pitch.

4. As a new article of manufacture, a wallboard comprising a porous cellular filling consisting principally of a mixture of relatively finely divided inorganic material and sulfite liquor pitch, and a liner of organic sheet material covering and adhering to one surface of said filling.

5. The method of making wallboard which comprises placing a mixture of relatively finely divided inorganic material and sulfite liquor pitch between two layers of sheet material, and heating the resulting assembly of mixture and sheet material to cause said mixture to intumesce into a porous mass having a multitude of cells interspersed therein.

HUGH McCURDY SPENCER.